United States Patent Office 3,479,129
Patented Nov. 18, 1969

3,479,129
NOVEL PROCESS FOR MODIFICATION OF FIBERS
Herbert N. Friedlander, Raleigh, and Virginia C. Menikheim, Chapel Hill, N.C., assignors to Monsanto Company, St. Louis, Mo., a corporation of Delaware
No Drawing. Filed Jan. 6, 1966, Ser. No. 519,000
Int. Cl. D06m *3/36;* B01j *1/10*
U.S. Cl. 8—115.5                6 Claims

ABSTRACT OF THE DISCLOSURE

Synthetic filaments such as nylon filaments are continuously passed through a reaction zone where they are exposed to light having wave lengths of from 2700 to 4800 angstroms in an atmosphere of chlorine and oxygen. Reaction probably occurs through light initiated formation of chlorine free radicals which attack the methylene groups causing the organic free radical containing polymer to selectively take up oxygen rather than chlorine. The chemical change is limited to the surface of the filament and the surface properties relating to static-electrification and wettability are enhanced without degradation of the bulk tensile properties of the filament.

---

This invention relates to a novel method for surface modification of synthetic organic filaments.

Filament surface properties are conventionally modified by application of coatings or finishes. It is known to reduce the build-up of static electricity through the use of finishes. Moreover, other properties of the filaments have been altered by the use of hydrophilic and hydrophobic finishes. A major concern relating to the use of such coating materials is the lack of permanence with which they adhere to the surface of the filament. All too often such coating materials are diminished or completely removed by normal laundering and dry cleaning treatments.

Thus, there is the need for filaments having permanently modified surface properties. That is, where peculiar properties are engendered by permanent chemical modification of the surface molecules of the filament, rather than by impermanent adherence to the surface of foreign molecules as commonly provided by finish materials. One such chemical modification results from oxidation reactions on the surface of the nylon filament. Such modifications reduce the static-electrification of the filament and also increase its wettability.

An object of this invention lies in the provision of a novel method for the surface modification of filaments derived from synthetic organic polymers to provide decreased static electrification and increased wettability, without substantial degradation of the bulk tensile properties of the filament.

In addition to the general objects above described, the instant invention further provides means by which the filament modification is made continuous.

These and other objects of the invention are realized by continuously passing filaments derived from synthetic organic polymers through a reaction zone exposed to light having wave lengths ranging from 2700 to about 4800 angstroms, while in the presence of an atmosphere comprising chlorine and oxygen. The speed of reaction which occurs in the irradiated zone is such that the surface properties of the filament can be modified in less than about one second in the reaction zone.

Treatment of filaments by the process of this invention is intended to result in surface modification only. That is, the chemical change is limited to the surface or skin of the filament such that chemical modification occurs only on the periphery of the filament. In this way the surface properties relating to static-electrification and wettability are enhanced without degradation of the bulk tensile properties of the filament.

It is postulated that the reaction occurs through light initiated formation of chlorine free radicals which are believed to attack the methylene groups whereupon the organic free radical containing polymer selectively takes up oxygen rather than chlorine. In any case, reaction velocity such that in-line modification can be accomplished appears to depend upon formation of atomic chlorine atoms in the presence of oxygen. Filaments modified by the process of this invention exhibit negligible concentration of chlorine indicating that, while chlorine is necessary in the reaction mechanism, the reaction with the polymer is essentially accomplished by oxygen.

Any light source which initiates wave lengths absorbed by chlorine to initiate free radicals may be used in accordance with this invention. Preferably, light having wave lengths in the range of from about 2700 angstroms to about 4800 angstroms are used for the chlorine sensitized oxidation because it is unnecessary to degas the filaments to remove oxygen dissolved therein insofar as such oxygen is transparent to wave lengths of greater than 2700 angstroms. As a practical matter the reaction zone is most conveniently irradiated with a fluorescent black light lamp emitting light having wave lengths in the range of from about 3000 to about 4000 angstroms. The intensity of light should, of course, be adequate to initiate substantial chlorine free radical formation. Thus, intensities between about $10^{11}$ to $10^{13}$ quanta per cubic centimeter are useful.

The time of exposure of the filaments to the irradiated mixture of oxygen and chlorine is interrelated to both the intensity of irradiation and the concentration of gases. For continuous in-line commercial operation the time of exposure can be adjusted for a period of between about 0.1 second to 1 second. This is not to say, however, that times outside this range cannot be employed.

The gaseous atmosphere in the reaction zone is a mixture of oxygen and chlorine. This may be provided by sweeping the zone with helium, nitrogen or some other essentially inert gas and thereafter during the continuous treatment supplying a mixture of chlorine and oxygen separately or combined to the reaction zone. Means may be provided for continuously removing reaction gases. The oxygen is preferably pure oxygen diluted with an inert gas. It may be oxygen enriched air. The ratio of the two gases may vary considerably and has not alone been found to be a critical aspect of the invention. However, ratio of chlorine to oxygen by volume should fall between 1:25 and 10:1 and preferably between 1:10 and 5:1.

The preferred materials used to form the fibers having modified surface structure according to this invention are conventional nylon polymers or linear polycarbonamides having the recurring $\pm(CH_2)_n NHCO\pm$ linkage such as those described in U.S. Patents 2,071,230; 2,071,253 and 2,130,948. These materials are well known in the art and are usually formed by reaction of suitable dicarboxylic acids or their amide forming derivatives with suitable diamines or by polycondensation of aminocarboxylic acids or their amide forming derivatives. Method for the formation of fibers, yarns, knitted and woven and nonwoven fabrics from nylon polymers are well known in the art and do not constitute a part of this invention. It is intended, however, that fiber modification as contemplated by this invention may occur at any stage in the processing of the fibers to form fabrics or on the fabrics themselves. Moreover the invention can be employed to modify the surface properties of filaments derived from other polymers included among such polymers as polyolefins, e.g.; polypropylene, polyesters, e.g. polyethylene terephthalate, and acrylonitrile polymers, e.g.; polyacrylonitrile and interpolymers thereof.

EXAMPLE I (ND-2-26)

A 74 denier monofilament spun from a polymer of nylon 66 having relative viscosity of 50.7, carboxyl end groups $52.4 \times 10^{-6}$ eq./gm. and amine end groups $59.3 \times 10^{-6}$ eq./gm. was continuously passed through a glass tube containing chlorine and molecular oxygen in a 1:1 ratio by volume at a velocity of 50 cm./sec. to provide a residence time of about 0.4 second. The glass tube was irradiated by a 4 watt fluorescent black light lamp providing wave lengths ranging from 3000–4000 angstroms. While the filament thus treated had tensile properties which were substantially the same as a control, the static electrification of the treated filament was found to be one-thirtieth of that of the untreated control.

EXAMPLE II

Example I was repeated with the exception that the exposure times and chlorine to oxygen ratios were varied as indicated:

| Sample | Exposure Time (Seconds) | Chlorine/Oxygen Ratio (by volume) |
|---|---|---|
| 57 | 0.3-0.5 | 1:25 |
| 56 | 0.25-0.5 | 1:3 |
| 59 | 0.2-0.3 | 3.2:1 |

Each of the above treated samples showed a greatly decreased static-electrification while maintaining substantially unchanged tenacity and elongation. For example, Sample 59 had a tenacity of 6.03 gm./denier and an elongation of 30% after treatment, compared with several control samples indicating tenacities ranging from 6.24–6.45 gm./denier and elongation ranging from 27.8–33 percent.

It has been noted that extraction of the filaments treated by the process of this invention in water or methanol tends to increase the static-electrification to some degree indicating that the treatment according to the invention degrades the surface such that certain soluble fractions are present. Because of the minuteness of the soluble fractions they have not been identified. Even so, the treated and extracted filaments exhibit a greatly reduced static-electrification when compared with control samples.

We claim:
1. A method for modifying the surface properties of a nylon filament which comprises passing said filament through a reaction zone irradiated by light having wave lengths in the range of from about 2700 to 4800 angstroms in the presence of an atmosphere comprising chlorine and oxygen in a ratio by volume of between about 1:25 and 10:1 respectively such that the residence time of the filament in said reaction zone is less than about one second.

2. The method of claim 1 wherein the ratio of chlorine to oxygen by volume is from about 1:10 to about 5:1.

3. The method of claim 1 wherein the mixture of chlorine and oxygen is diluted with an inert gas.

4. The method of claim 1 wherein the filament passing through the reaction zone is thereafter washed in a liquid selected from the group consisting of water and methanol.

5. A nylon filament modified according to the method of claim 1.

6. A filament modified according to the method of claim 4.

References Cited
UNITED STATES PATENTS

| 1,825,178 | 9/1931 | Coghill | 8—115.6 X |
| 2,801,447 | 8/1957 | Wolinski | 18—48 |
| 3,012,905 | 12/1961 | Tillisch | 117—106 |

HERBERT B. GUYNN, Primary Examiner

U.S. Cl. X.R.

204—159.18